(12) United States Patent
Kamalakantha et al.

(10) Patent No.: US 10,356,026 B2
(45) Date of Patent: Jul. 16, 2019

(54) DATA MANAGEMENT IN A DISTRIBUTED COMPUTING ENVIRONMENT

(71) Applicant: Hewlett Packard Enterprise Development LP, Houston, TX (US)

(72) Inventors: Chandra H. Kamalakantha, Plano, TX (US); Parag Doshi, Marietta, GA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 310 days.

(21) Appl. No.: 15/303,084

(22) PCT Filed: Apr. 25, 2014

(86) PCT No.: PCT/US2014/035547
§ 371 (c)(1),
(2) Date: Oct. 10, 2016

(87) PCT Pub. No.: WO2015/163924
PCT Pub. Date: Oct. 29, 2015

(65) Prior Publication Data
US 2017/0034095 A1    Feb. 2, 2017

(51) Int. Cl.
| G06F 15/16 | (2006.01) |
| H04L 12/58 | (2006.01) |
| G06F 21/62 | (2013.01) |
| H04L 12/40 | (2006.01) |
| H04L 29/08 | (2006.01) |
| H04L 29/06 | (2006.01) |

(52) U.S. Cl.
CPC .......... *H04L 51/14* (2013.01); *G06F 21/6227* (2013.01); *H04L 12/40* (2013.01); *H04L 67/26* (2013.01); *H04L 63/20* (2013.01); *H04L 67/10* (2013.01)

(58) Field of Classification Search
CPC ......... H04L 51/14; H04L 67/26; H04L 12/40; H04L 63/20; H04L 67/10
USPC ................................................. 709/206, 223
See application file for complete search history.

(56) References Cited

U.S. PATENT DOCUMENTS

| 8,019,812 | B2 | 9/2011 | Janedittakarn et al. |
| 8,122,055 | B2 | 2/2012 | Grewal et al. |
| 8,549,064 | B2 | 10/2013 | Kamalakantha |
| 8,620,876 | B2 | 12/2013 | Chan et al. |
| 2004/0010519 | A1 | 1/2004 | Sinn et al. |
| 2005/0278410 | A1 | 12/2005 | Espino |
| 2006/0277319 | A1 | 12/2006 | Elien et al. |
| 2009/0265161 | A1* | 10/2009 | Fletcher ............ G06F 17/30684 704/9 |

(Continued)

OTHER PUBLICATIONS

International Searching Authority. International Search Report, dated Jan. 21, 2015. Application No. PCT/US2014/035547 Filed date Apr. 25, 2014, 10 pages.

*Primary Examiner* — Philip B Tran

(57) ABSTRACT

A method for managing data in a distributed computing environment comprises receiving, on a message bus, a request to communicate data between a first system hosting data and a second system accessing data, referencing a policy defining rules for sharing data between the first system and the second system, compiling, based on the policy, a message indicating subscribers to receive the data to publish, and publishing, on the message bus, the compiled message.

17 Claims, 7 Drawing Sheets

(56) References Cited

U.S. PATENT DOCUMENTS

| | | |
|---|---|---|
| 2010/0333111 A1* | 12/2010 | Kothamasu ............ H04L 51/14 719/313 |
| 2011/0047595 A1 | 2/2011 | Diep et al. |
| 2013/0031157 A1 | 1/2013 | McKee et al. |
| 2013/0238641 A1 | 9/2013 | Mandelstein et al. |
| 2013/0246594 A1 | 9/2013 | Ahmad et al. |
| 2013/0290244 A1 | 10/2013 | Nucci et al. |
| 2013/0290381 A1 | 10/2013 | Nucci et al. |
| 2013/0290690 A1 | 10/2013 | Nucci et al. |

* cited by examiner

200

| Client Name 202 | Client Age 203 | Client Diet 204 | Client SSN 205 |
|---|---|---|---|
| Jane Poe 206 | 25.5 207 | Vegetarian 208 | 123-45-6789 209 |
| John Doe 210 | 42 211 | No Limits 212 | 234-56-7891 213 |
| Robert Roe 214 | 33.7 215 | Kosher 216 | 345-67-8912 217 |
| Carla Coe 218 | 49.2 219 | No Peanuts 220 | 456-78-9123 221 |

229

| Client Name 230 | Client Age 231 |
|---|---|
| Jane Poe 232 | 25 233 |
| John Doe 234 | 42 235 |
| Robert Roe 236 | 33 237 |
| Carla Coe 238 | 49 239 |

*Fig. 2*

DATA MANAGEMENT IN A DISTRIBUTED COMPUTING ENVIRONMENT

BACKGROUND

Data management systems may provide a system to reference data hosted on a plurality of systems. A data management system may include a meta-data repository system that stores data describing a plurality of systems and applications hosting or accessing data. A data management system may include information about data distribution formats corresponding to the plurality of systems. A data management system may produce and store an impact analysis of the effect a change would have on the plurality of systems and applications.

BRIEF DESCRIPTION OF THE DRAWINGS

The accompanying drawings illustrate various examples of the principles described herein and are a part of the specification. The examples do not limit the scope of the claims.

FIG. 2 is a diagram of a system to implement the method of FIG. 1, according to one example of the principles described herein.

Throughout the drawings, identical reference numbers designate similar, but not necessarily identical, elements.

DETAILED DESCRIPTION

In enterprise data environments, data management may ensure both access to data, as well as prevent access to data by individuals lacking permission. Failure to have access to data may inhibit the ability of users to perform tasks. Failure to control data access may result in unintentionally exposed data, security violations, or multiple different versions of the same data.

Enterprise data environments may need control over which systems have access to and store data. Such controls may consider the identity of the accessing system and the relationship to the system hosting the data. Control over the data may include factors such as system location, system ownership, system security, and other factors.

Enterprise data environments may also consider security factors in data management. A data access policy may instruct transmission via secure networks or protocols, and may instruct that either the hosting system or accessing system meet a security standard. The security standard may include security qualifications, security product usage, software revision specifications, or similar standards. The security standard may also include a condition for data storage, such as data encryption or physical data security.

Enterprise data environments may also benefit from increased control over data. Data control can be enhanced by controlling who may access data based on a number of factors. Factors may include user identity, accessing system identity, physical location, or other factors. Enterprise data environments may wish to control data for a number of reasons, such as security, data replication costs, data synchronization errors resulting in data corruption, and data confidentiality.

The present systems and methods describe how to manage data effectively while meeting the conditions of data tenancy, data security, and data control to enable an enterprise data management system to provide a safe and effective method of sharing data.

As used in the present specification and in the appended claims, the term "a number of" or similar language may include any positive number including one to infinity; zero not being a number, but the absence of a number.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described, but may not be included in other examples.

Figure 1:
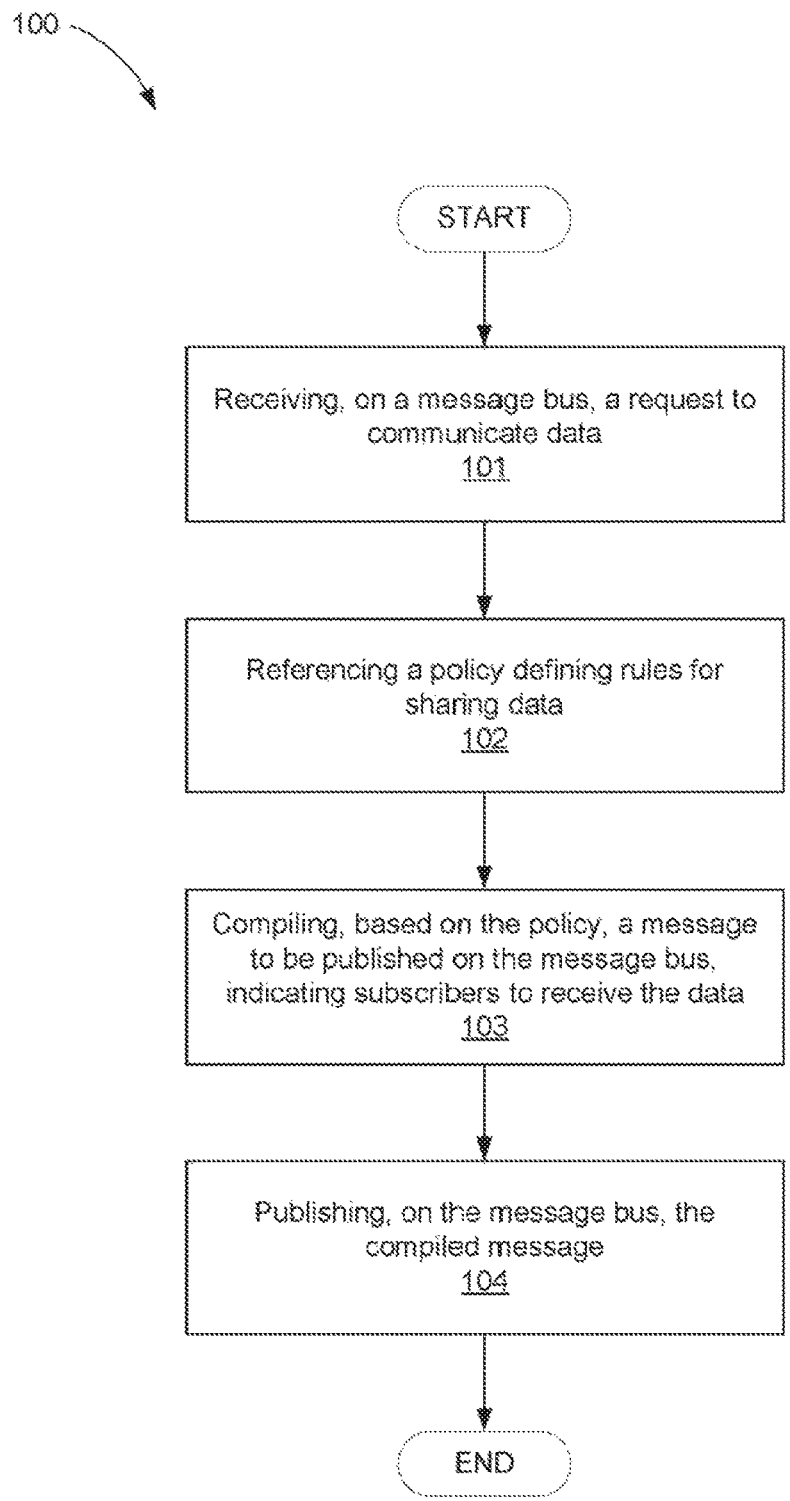
FIG. 1 is a flow chart of a method for receiving and publishing data in an enterprise environment, according to one example of the principles described herein.

Referring now to the figures, FIG. 1 is a flow chart of a data management method (100) according to one example of the principles described herein. As will be described, the data management method (100) may receive (101) on a message bus a request to communicate data between a first system hosting data and a second system accessing data. The data management method (100) may reference (102) a policy defining rules for sharing data between the first system and the second system. The method may compile (103), based on the policy, a message indicating subscribers to receive the data for publishing. The method (100) may publish (104), on the message bus, the compiled message.

In receiving (101), on a message bus a request to communicate data between a first system hosting data and a second system accessing data. The message may originate from the first system hosting the data, the second system accessing the data, or a third system that is serving as a data control agent.

One manner of receiving (101), on a message bus a request to communicate data between a first system hosting data and a second system accessing data is to receive (101) a message from the second system. The second system may send the message in a number of formats. The message may be in the form of data access. In this example, the second system may access data that may not be present on the second system, or may be marked as needing updates. The data access may cause the second system to send a message to an enterprise data management driver, requesting that the data being referenced. Receiving (101) a message from the second system may sometimes resemble polling data to see if the data has changed.

In another example of receiving (101), on a message bus, a request to communicate data from the first system, the first system may be aware that the second system has requested updates to data hosted by the first system. Rather than the second system polling, or periodically checking, new data on the first system, the first system may push data to the second system. The push method of communicating data may permit the second system accessing data to be notified of data changes almost synchronously when relevant data has changed on the first system hosting the data. The first system may cooperate with the second system to ensure that the second system has relevant data. This cooperation may be beneficial when the data changing is infrequent, or the computational power or network bandwidth increase the computing cost of polling for data.

Receiving (101) on a message bus may also include receiving from a third system, a request to transmit data. By allowing a third system to initiate a data propagation request, the third system may provide additional control over data access. The third system may perform an additional security check prior to data access. The third system may perform other tasks in the process including logging or monitoring access to data. Data access may be monitored and reported as it occurs.

The data management method (100) may reference (102) a policy defining rules for sharing data between the first system and the second system. The policy may be determined by iterating a base table and an archive table containing information about the first system hosting data and the second system accessing data. While iterating the base table and the archive table, a results table may be populated by performing table difference operations between the base table and the archive table. A policy can be determined by extracting, out of the results table, identification of data to publish on the message bus. The results table may be archived and referenced in future operation to determine policy as part of either the base table or the archive table.

The policy may control how data is transmitted to the second system accessing the data. The second system accessing data may store the data in an alternative format. Data may be modified before transmission to the second system to alter the presentation, perform calculations, combine data references, or remove non-requested information. This transformation may occur according to one example of the principles described herein. An example of this may include a first system hosting data, which may store a field as a floating point or a decimal value. The second system accessing the data may be interested in the value as an integer or a whole number. The data management method (100) may transform the data from a floating point or decimal type to an integer or whole number type.

A portion of the policy may be transmitted may be transmitted to the system accessing the data and inform it a duration of time that the data may be stored. The policy may limit the duration of time that data may be stored to restrict the length of time the data may be vulnerable to unauthorized access. The policy may also limit the duration of time that the data may be stored to motivate the system accessing the data to refresh the data.

The data management method (100) may also facilitate data security. For example, the first system hosting data may specify a security protocol that may be used to transmit data. The data management method (100) may request data from the first system hosting data, using the security protocol specified by a data management policy. Security protocols may include protocols such as the internet protocol security (IPSec), secure hypertext transfer protocol (https), secure shell (ssh), specific grades of encryption, or similar protocols that may be used to secure data during transmission.

The data management method (100) may also communicate to the second system accessing data security policies that may be used to secure the data being accessed. An example of a data security policy for data storage may include the data being stored in an encrypted format. Another data security policy may include the system accessing the data having a system security product installed. The data security policy may specify that the data accessed may not be stored, or may not be retransmitted to a third system. Any number of policies that affect the data storage on the second system accessing the data may be used, and said policies may or may not be set or communicated by the data management method (100) to the first system hosting data, to the second system, or to other systems communicating with the data management method.

FIG. 2 is an illustration of how data may be transformed by the data management method (FIG. 1, 100). The original data table (200) is displayed as a grid. The original data table (200) may be stored as a database, a text file, a comma delineated file, a tab delineated file, a spreadsheet, or similar data storage mechanism. In the example given, the original data table (200) has four fields representing client name (202), client age (203), client diet (204), and client social security number (205).

The clients Jane Poe (206), John Doe (210), Robert Roe (214), and Iris Wood (218) are represented as having data in the original data table. Jane Poe (206) is shown to have an age (203) of 25.5 (207), the client diet (204) is vegetarian (208), and the client social security number (205) is 123-45-6789 (209). John Doe (210) has a client age (203) of 42 (211), the client diet (204) has no limitations (212), and the client social security number (205) is 234-56-7891 (213). The client Robert Roe (214) has a client age (203) of 33.7 (215), the client diet (204) is kosher (216), and the client social security number (205) is 345-67-8912 (217). The client Carla Coe (218) has a client age (203) of 49.2 (219), the client diet (204) is no peanuts (220), and the client social security number (205) is 456-78-9123 (221).

The data management method (FIG. 1, 100) may receive a policy to manage the data in the original data table (200). Data in the original data table (200) may have different security interests. For example, the client name (202) and client age (203) may be freely shared with any system accessing the data. The client diet (204) may indicate health concerns, such as allergies, diabetes, Celiac disease or other medical conditions. A law or company policy may restrict distribution of this data. The data management method (FIG. 1, 100) may receive a policy indicating that the client diet (204) may not be generally shared, but may be accessed by systems that have a reason to know about the data.

Similarly, a client social security number (205) may have a separate security policy relating to who may access the data, as well as how the data is transmitted and stored. The system hosting the data, or a system administrator, may communicate a policy that a restricted set of systems may access the client social security number (205), the access may be through a secure port, and/or the client social security number (205) may not be stored.

When a second system accessing the data requests to view the data, the second system may establish a policy that the system presenting the data in an alternative format. In one example, the client age (203) in the original data table is stored as a floating point or decimal. This is shown by Jane Poe (206) having an age of 20.5 (207). Robert Roe (214) has an age of 33.7. A second system accessing the data may have a policy that the data may be received in an alternative format table (229). The alternative format may be used to simplify integration on the second system accessing the data, or may eliminate unreferenced fields in the original data table (200).

The second system accessing the data may request that the data management method communicate the client name (202) and the client age (203). The client diet (204) and client social security number (205) are not referenced, and may not be communicated. An alternative format table (229) may reduce the original format table (200) to provide the client name (230) and client age (231). The client age (231) in the alternative data table (229) is stored as an integer or whole number, while the client age (203) in the original data table (200) is stored as a floating point or decimal value.

The alteration of data by the data management method (FIG. 1, 100) may be used to simplify data integration by the second client accessing the data.

Figure 3:
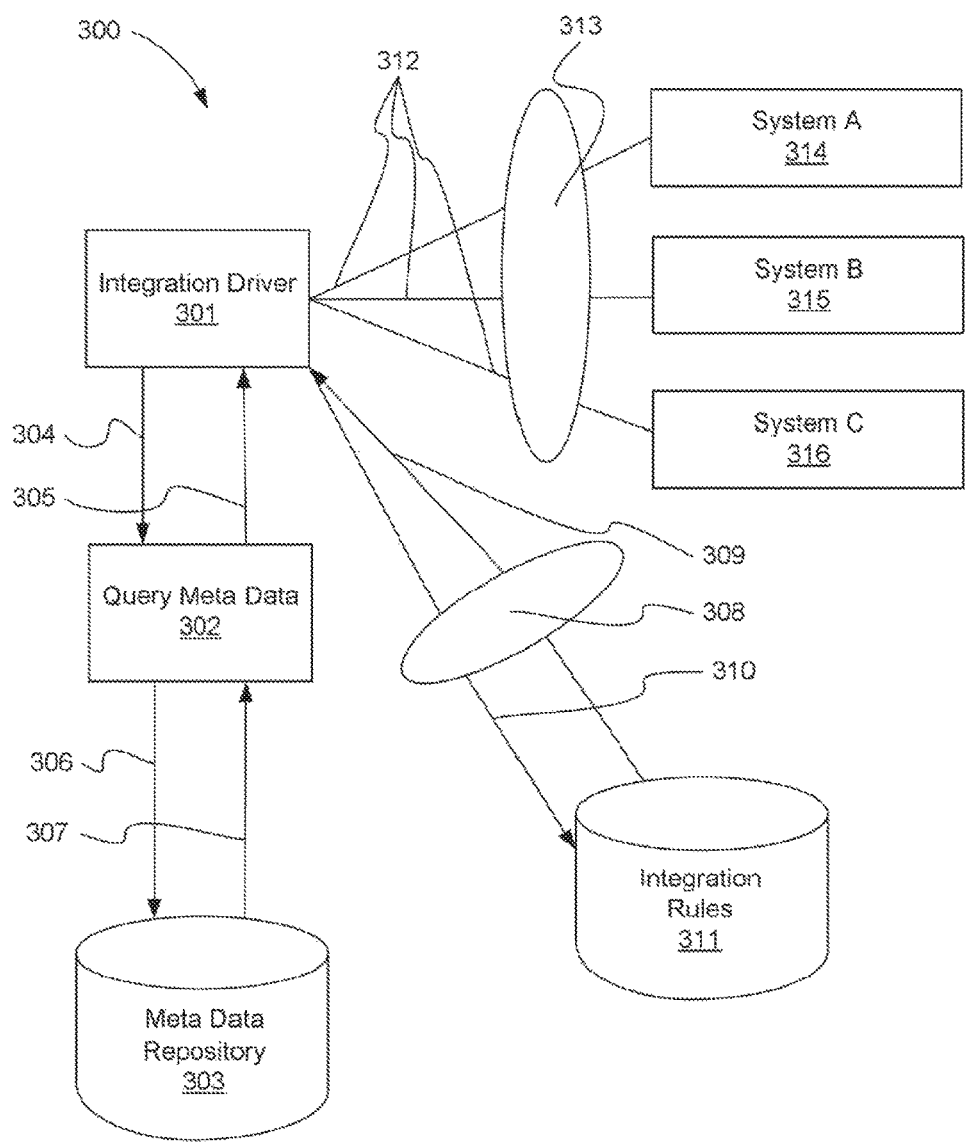
FIG. 3 is a diagram of data policies rules as used by the method of FIG. 1, according to one example of the principles described herein.

FIG. 3 represents a data management system (300) that uses one example of the principles described herein. The data management system may include an integration driver (301) to facilitate communication between components of the data management system (300). The integration driver (301) may send a query (304) to query meta data (302). The query meta data (302) may read (306) the meta data from a meta data repository (303). The meta data repository (303) may return (307) the meta data to the query meta data (302). The query meta data (302) may return (305) data elements to the integration driver (301).

The integration driver (301) may send a query (310) using a policy interface (308) to a set of integration rules (311). The query (310) may return (309) integration rules through a policy interface (308). The integration rules (311) may establish policies as to data tenancy, data access, or data presentation.

The integration driver (301) may also utilize a number of communication channels (312), using a number of interfaces (313) to communicate with a number of systems (314, 315, 316).

The integration driver (301) may be a computing device, or may be co-located with data that is accessed by a computing system. The integration driver (301) may also be co-located with a set of integration rules (311), a meta data repository, or a combination thereof.

The meta data repository (303) may store information associated with various clients (314, 315, 316), to permit a token to produce a variety of information related to the clients (314, 315, 316). The data referenced in the meta data repository (303) may include information used to communicate with or identify the clients (314, 315, 316). An example of such data might be the public toke used by a secure shell to encrypt communication between the integration driver and the clients (314, 315, 316). Data may also be stored related to the clients (314, 315, 316), such as security product and client location. Additional data related to the clients (314, 315, 316) may be used to allow the integration rules (311) to be fully applied to each client.

The integration driver (301) may send a query (310) using an interface (308) to read integration rules (311). The integration rules (311) may be communicated to the integration driver (301) using a set of interfaces (308).

The integration rules (311) may express a policy that a set of data, residing on System A (314), may be accessed by clients that fit a certain set of characteristics. An example of a characteristic that may be expressed in the integration rules (314) is that the systems accessing the data hosted on System A (314) reside in a common geographic area. A system not residing in the geographic area may not be allowed to access the data. Another example is that the systems accessing the data hosted on System A (314) share a common administrator. A third example is that the systems accessing the data hosted on System A (314) have a common owner or responsible entity.

The integration rules (311) may be stored such that the systems with integration rules (311) may share the same integration rules (311) or may each have a unique set of rules. An example is system A (314) and system B (315) may share a set of integration rules (311), while System C (316) may have a unique set of integration rules (311).

The integration rules (311) may also include instructions on data transformation, as shown in FIG. 2. An integration rule (311) may specify that the client name (FIG. 2, 202) and client age (FIG. 2, 203) be communicated while altering the format of the client age (FIG. 2, 203). The integration rules (311) may specify that the client diet (204) and client social security number (205) be omitted. The transformed data table (FIG. 2, 229) may then be shared with clients (314, 315, 316).

The integration rules (311) may specify communication protocols to be used when accessing data. An example of a communication protocol may be that system A (314) maintains financial data, and the policy is that financial data be communicated via encrypted protocols. The integration rules (311) may inform that an encrypted protocol is to be used, and may also inform which encrypted protocol is to be used.

The integration rules (311) may express a security policy that the clients (314, 315, 316) accessing data meet a security specification, such as a security firewall, virus protection, or special product versions.

The integration rules (311) may express a policy for other attributes of data security. A policy may be expressed that, while clients (314, 315, 316) may access data, they are not to store the data in local stable storage. This may include saving the data on a hard disk. The integration rules may also express that data saved to the clients (314, 315, 316) is to be stored in an encrypted format.

Figure 4:
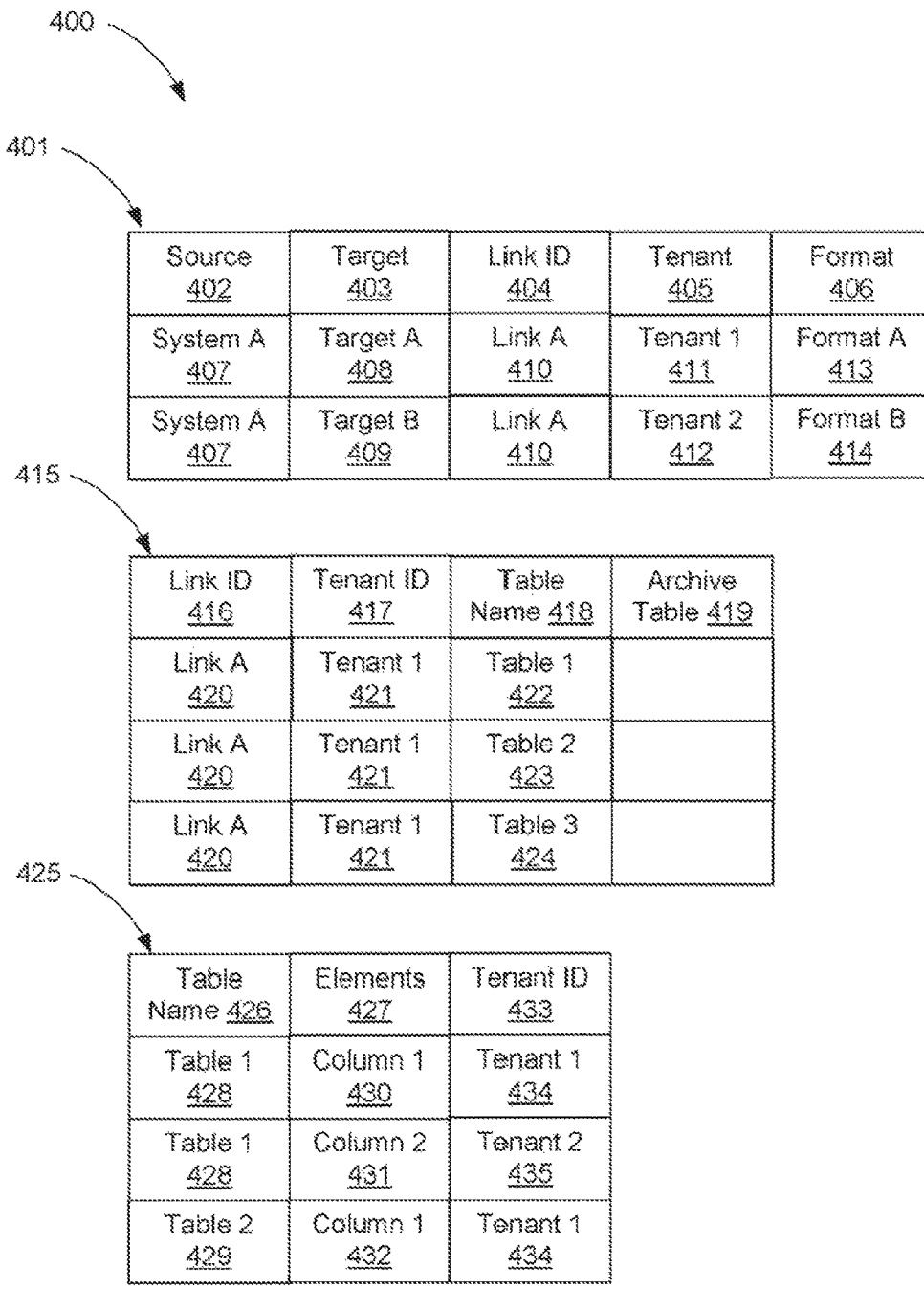
FIG. 4 is an illustration of interfaces as may be used by the method of FIG. 1, according to one example of the principles described herein.

FIG. 4 is a set of integration rules (400) according to one example of the principles described herein. The integration rules (400) may include a data tenancy table (401), which may express policies related to data tenancy. The integration rules (400) may also contain a table of data locations (415) used derive a data access policy. The integration rules (400) may contain a table of data transformation rules (425) used to transform, filter, or modify data presented to a system accessing the data.

The data tenancy table (401) may include fields indicating a source (402) of data, a target (403) accessing the data, a link identification (404), a data tenant (405) and a data format (406). The tenancy table (401) may include these fields, may include additional fields, or may not include all these fields.

The source (402) of the data represents a system on which the data resides. In this example, the data source (402) is shown as system A (407). A different example may show multiple systems as sources (402) of data. The data source (402) may be a system that is the host of the data. The data source (402) may control the authoritative state of the data.

The data target (403) may show systems that have access to data on the data source (402). In this example there are shown two systems with access to the data. The data targets (403) are shown to be Target A (408) and Target B (409).

The link identification (404) is shown as link A (410). A link may represent a network interface card, a subnet address, a system identification, or a secured connection to a client or group of clients. A link identification (404) may specify a secure communication port for a client. The link identification may provide identification for the integration driver (FIG. 3, 301) to communicate the data that is hosted on a system to another system accessing the data.

A tenant identification (405) may identify a system that is to serve as an interim host for data being replicated in the environment. The tenant may provide local access to a target system (408, 409). The tenant system (411, 412) may synchronize access for the target systems (408, 409). The tenant system (411, 412) may also reduce transmission overheard from the system hosting the data to multiple systems accessing the data, by replicating the data closer to the systems accessing the data. Closer is defined as being able to access the data over a computer network at a lower overhead due to factors such as transmission time, transmission latency, transmission cost, or similar factors.

A target system (408, 409) may request that data be presented in an alternative format (406). Such formats (413, 414) may present the data in an alternative format. An alternative format may include removing portions of the data. An alternative format may include performing functions on the data to alter the state of the data. An alternative format may include presenting the data as an alternative data type. An alternative format may include altering the binary representation of the data to make it accessible by a computer program.

A table of data locations (415) used derive a data access policy. The table (415) may contain information as to how the data has been accessed, rules that apply to the data, or other patterns of data access. The table (415) may include identification of the tenant (417), the name of the data table (418) being accessed and an archive table (419) that contains historical data.

The integration driver (FIG. 3, 301) may perform operations based on the client (417), the data table (418), the archive table (419), and other information to inform access to the data. An integration driver (FIG. 3, 301) may, for example, detect a pattern in data access, and may prepare data for access based on access patterns of the clients (417)

A table of data locations (415) may contain multiple entries related to data access for a single system, target (403) or tenant (405). The tenant (421) may have multiple tenant identification (417) entries. The tenant (421) may connect the multiple entries to a single link A (420), or may be accessible via a number of link identification (416)

A tenant (421) identified by a tenant identification (417) may create an archive table (419) when accessing data. Failure to specify an archive table (419) may indicate that no archive table is to be maintained, and that the integration driver (FIG. 3, 301) may use a set of default behaviors to govern data access. Failure to specify an archive table (419) may indicate a default name of the table. The default name may be based on the link identification (416), the tenant identification (417), the table name (418) being accessed, or other data, to establish a default archive table (419) name.

A table of data transformation rules (425) may specify the transformation, filter, or modification data presented to a system accessing the data. The rules may apply to a single tenant (405), all tenants (405) of a source (402), or similar derivations. A table of data transformation rules (425) may specify which tenant (433) the rule applies to and what data elements (427) are to be presented to the tenant (433).

The transformation table (425) may specify elements (427) of data that may be presented to a tenant (405). For example, the table of data transformation rules (425) shows that Tenant 1 (434) may be presented column 1 and column 3 (330) from table 1 (428). The table of data transformation rules (425) shows that tenant 2 (435) may be presented field 2 and field 3 (431) of table 1 (428).

The table of data transformation rules (425) allows the data to be presented for each tenant (434) in an alternative format. The transformed data may allow for simplified integration by the tenant (433), may allow for the suppression of sensitive data, may reduce the amount of data that is replicated to the tenant (433), or similar purposes.

Figure 5:
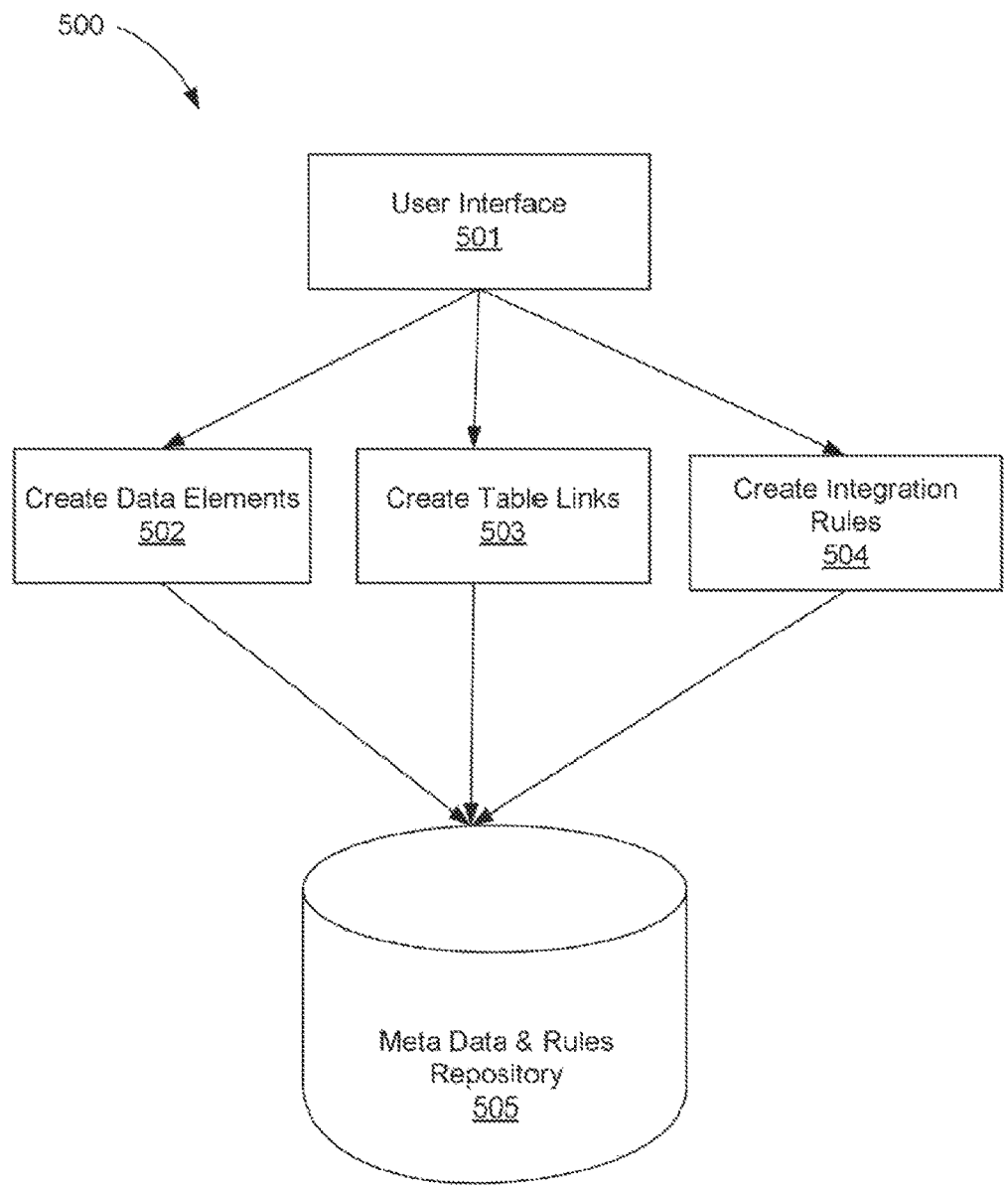
FIG. 5 is a diagram of a data integration driver, according to one example of the principles described herein.

FIG. 5 shows an example of a configuration system (500) according to one example of the principles described herein. A set of user interfaces (501) may allow users to create data elements (502), create table links (503), and/or create integration rules (504). When the user creates data elements (502), creates table links (503), or creates integration rules (504), the configuration system (500) may store the changes in a meta data and rules repository (505).

The user interface (501) may provide a level of data abstraction, allowing underlying data interfaces to be altered without exposing those changes to a user. A user interface may also provide support to access the data via alternative communication channels, such as network interfaces and protocols, or library interface abstractions. The user interface (501) may be directed at a programming language, and may be implemented to enable a protocol to have simplified access to the meta data and rules repository.

An interface may create data elements (502). By providing a client with a user interface (501) to create data elements (502) the client may create new rules. By allowing an interface to create data elements (502), a client may explicitly associate data with a client or tenant. The interface may enable rules that use or manipulate the data element. An example of creating a data element may be creating a meta data structure associated with a number of systems, indicating ownership of the system. An integration rule (504) may then publish certain data to the systems with the data element.

An interface may create table links (503) to allow for systems to share a set of meta data or rules in the repository (505). An example would be when system 1 and system 2 receive the same meta data. By providing a link from one system to the other, an update to the meta data for one system will have the effect of modifying the meta data for both systems. Similarly, a link may allow for an integration rule to be applied to multiple systems, by which a single modification to the table would apply to all systems linked together.

An interface to create integration rules (504) may allow for the modification of rules related to data that may be accessed by a client or tenant. Such rules may control data element access, data elements that may not be accessed, the frequency with which data is updated, how often data is checked for changes, how data may be modified prior to presentation, the format of presentation, or a similar rule specification.

FIG. 5 illustrates a set of creation interfaces, the principles described herein may also be applied to additional interfaces, such as interfaces to modify data elements, modify table links, or modify integration rules. The principle described herein may provide for additional interfaces to allow for the management and control of the meta data and integration rules repository (505).

Figure 6:
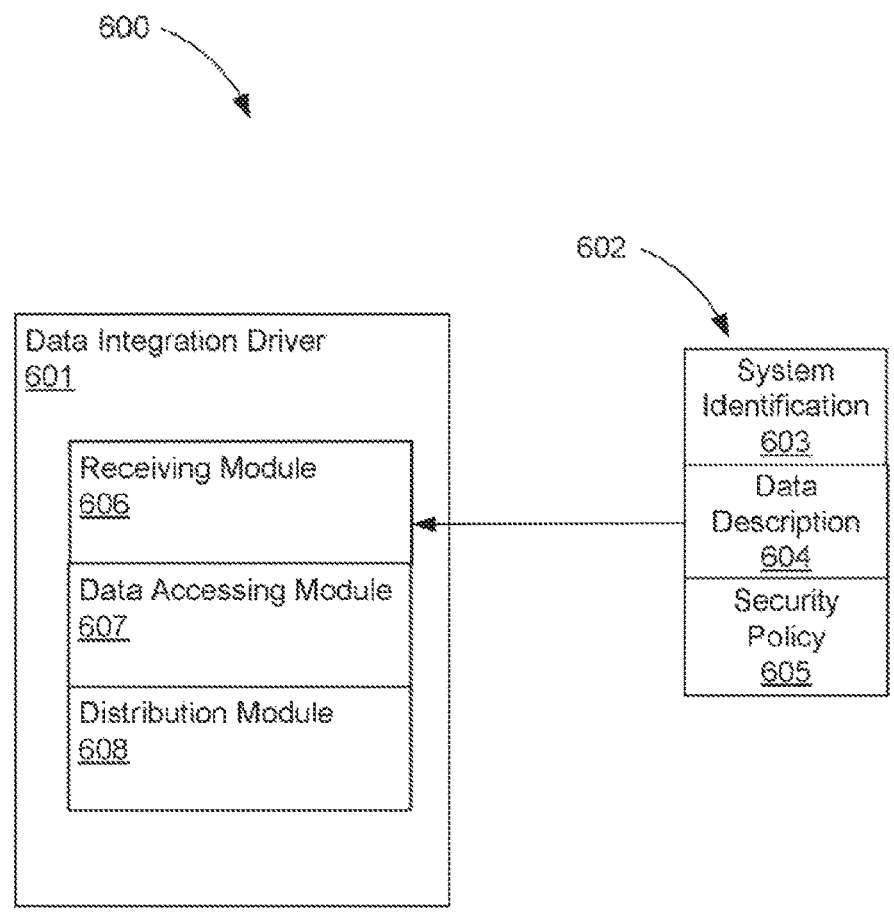
FIG. 6 is a diagram of a computer device for enterprise data management, according to one example of the principles described herein.

FIG. 6 represents a data integration system (600) wherein a data integration driver (601) is receiving a data message (602). The data integration driver may comprise a receiving module (606), a data accessing module (607) and a distribution module (608). The data message (602) may contain a system identification (603), a data description (604) and a security policy (605).

The data integration driver (601) may be used to manage data in a distributed computing environment. The data integration driver (601) may be hosted on a single system, or may be hosted on a number of systems. The data integration driver (601) may be hosted on a number of systems dedicated to serving as host for the data integration driver (601), or may be hosted on a system that serves other purposes.

The data integration driver (601) may include a receiving module (601) to receive, from a first system hosting data, a message (602) relating to the data that is being made available to the data integration driver. The receiving module (606) may receive the message through a network protocol, may be invoked directly, or may wait to receive messages through another interface.

The message (602) being received may comprise an identification (603) of the system that is hosting the data. The message (602) may comprise a data description (604) describing the data being made available. The description may include formatting information, classification information, plain English summaries, or other information useful in describing the data being made available. The message (602) may contain information relating to the security policy (605) that the system hosting the data would like to have followed in accessing the data.

The security policy (605) may comprise an encryption policy for transmitting the data. Encrypting data prior to transmission may prevent unauthorized access to data while data is being relayed. The security policy (605) may include encryption policy for storing data, and the distribution module (608) may distribute that policy with the data.

Figure 7:
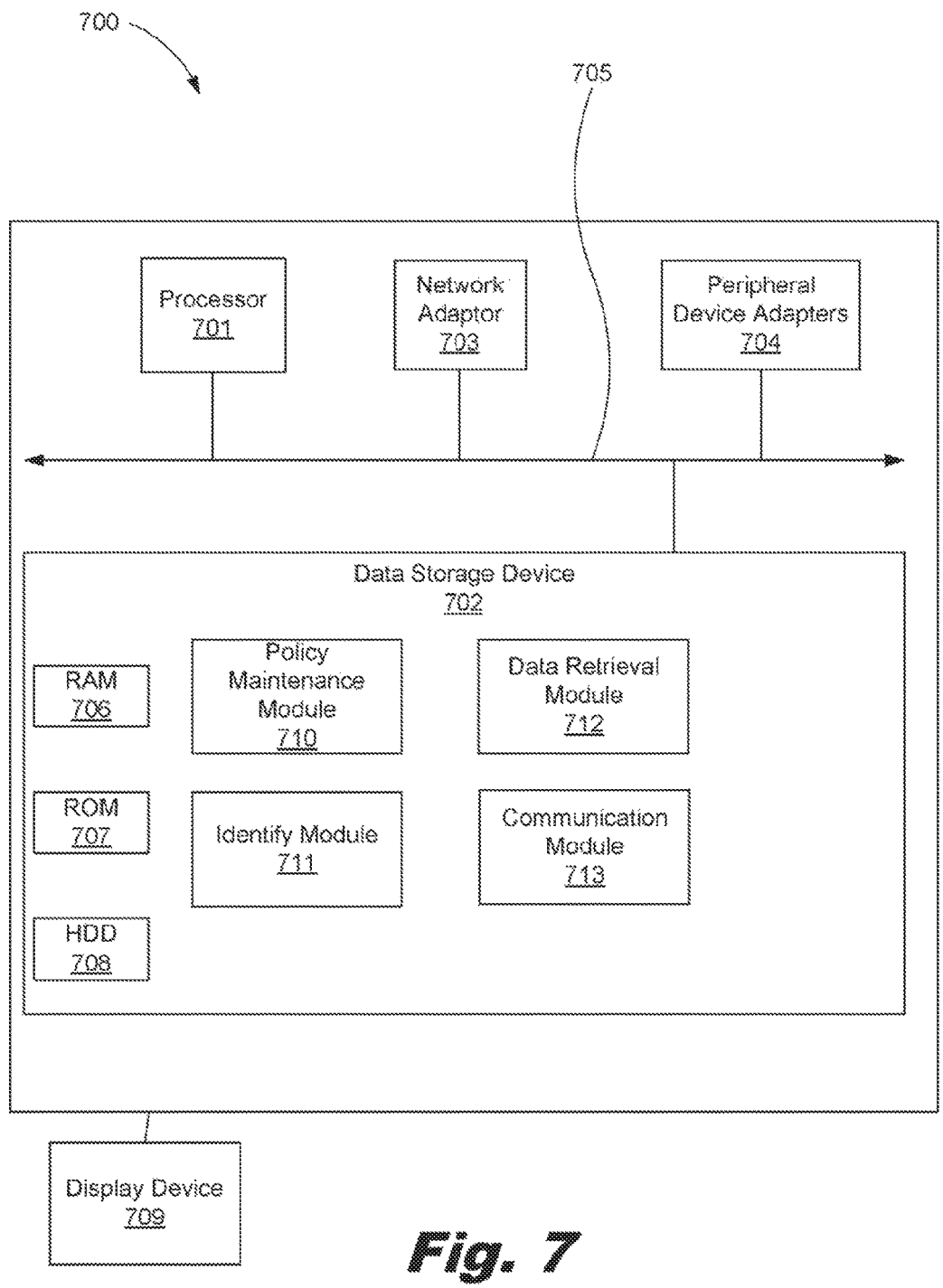
FIG. 7 is a block diagram of a computing device according to some examples.

FIG. 7 represents a computing device for managing data in a distributed computing environment, according to one example of the principles described herein. The computing device (700) for managing data in a distributed computing environment may be implemented in an electronic device. Examples of electronic devices include servers, desktop computers, laptop computers, personal digital assistants (PDAs), mobile devices, smartphones, gaming systems, and tablets, among other electronic devices.

The computing device (700) may be utilized in any data-processing scenario, including stand-alone hardware, mobile applications, a computing network, or combinations thereof. Further, the computer (700) may be used in a computing network, a public cloud network, a private cloud network, a hybrid cloud network, other forms of networks, or combinations thereof. In one example, the methods provided by the computing device (700) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others: an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (700) are executed by a local administrator.

To achieve its desired functionality, the computing device (700) comprises various hardware components. Among these hardware components may be a number of processors (701), a number of data storage devices (702), a number of peripheral device adapters (704), and a number of network adapters (703). These hardware components may be interconnected through the use of a number of buses and/or network connections. In one example, the processor (701), data storage device (702), peripheral device adapters (704), and a network adapter (703) may be communicatively coupled via a bus (705).

The processor (701) may include the hardware architecture to retrieve executable code from the data storage device (702), and to execute the executable code. The executable code may, when executed by the processor (701), cause the processor (701) to implement, at least, the functionality of processing data obtained from the diagnostic cassette (714), according to the methods of the present specification described herein. In the course of executing code, the processor (701) may receive input from, and provide output to, a number of the remaining hardware units.

The data storage device (702) may store data, such as executable program code, that is executed by the processor (701) or other processing device. As will be discussed, the data storage device (702) may specifically store computer code representing a number of applications that the processor (701) executes to implement at least the functionality described herein.

The data storage device (702) may include various types of memory modules, including volatile and nonvolatile memory. For example, the data storage device (702) of the present example includes Random Access Memory (RAM) (706), Read Only Memory (ROM) (707), and Hard Disk Drive (HDD) memory (708). Many other types of memory may also be utilized, and the present specification contemplates the use of many varying type(s) of memory in the data storage device (702) as may suit a particular application of the principles described herein. In certain examples, different types of memory in the data storage device (702) may be used for different data storage needs. For example, in certain examples the processor (701) may boot from Read Only Memory (ROM) (707), maintain nonvolatile storage in the Hard Disk Drive (HDD) memory (708), and execute program code stored in Random Access Memory (RAM) (706).

Generally, the data storage device (702) may comprise a computer readable medium, a computer readable storage medium, or a non-transitory computer readable medium, among others. For example, the data storage device (702) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (703, 704) in the computing device (700) enable the processor (701) to interface with various other hardware elements, external and internal to the computing device (700). For example, the peripheral device adapters (704) may provide an interface to input/output devices, such as, for example, a display device (709), a mouse, a keyboard or the diagnostic cassette (714). The peripheral device adapters (703) may also provide access to other external devices, such as an external storage device, a number of network devices such as, for example, servers, switches, and routers, client devices, other types of computing devices, and combinations thereof.

The display device (709) may be provided to allow a user of the computing device (700) to interact with and implement the functionality of the computing device (700). The peripheral device adapters (704) may also create an interface between the processor (701) and the display device (709), a printer, or other media output devices. The network adapter (703) may provide an interface to other computing devices within, for example, a network, thereby enabling the transmission of data between the computing device (700) and other devices located within the network.

The computing device (700) may, when executed by the processor (701), display the number of graphical user interfaces (GUIs) on the display device (709) associated with the executable program code, representing the number of applications stored on the data storage device (702). The GUIs may include aspects of the executable code, including measurements taken of properties of a fluid sample. The GUIs may display, for example, a count of a particular type of cell carrying a particular attribute. Additionally, via making a number of interactive gestures on the GUIs of the display device (709), a user may display additional information regarding properties of other particles in the fluid sample. Examples of display devices (709) include a computer screen, a laptop screen, a mobile device screen, a personal digital assistant (PDA) screen, and a tablet screen, among other display devices (709). Examples of the GUIs displayed on the display device (709) will be described in more detail below.

The computing device (700) further comprises a number of modules used in the implementation of the management system for data in a distributed environment. The various modules within the computing device (700) comprise executable program code that may be executed separately. In this example, the various modules may be stored as separate computer program products. In another example, the various modules within the computing device (700) may be combined within a number of computer program products; each computer program product comprising a number of the modules.

The computing device (700) may include a policy maintenance module (710) made to, when executed by the processor (701), maintain policies related to data access, storage, and propagation. The identify module (710) may identify a system accessing data or a system hosting data, as well as identifying meta data and policies associated with the systems. The data retrieval module (712) retrieves data from a system hosting the data, according the security policy related to that data. A communication module (713) communicates the data retrieved by the a system that may access the data.

The policy maintenance module (710) may implement policies as described in FIG. 5. The module (710) may include an access policy related to how a client may access the data. The access policy may restrict the client from accessing portions of data, may allow for the replication of data, may control the security policy related to the data, or similar policy decisions.

The policy maintenance module (710) may read a policy set by a user, a client, or a data host. The policy maintenance module (710) may reference an archive table (FIG. 4, 419), a log table (FIG. 4, 418), and/or other policy information to derive a usage policy for a client or tenant.

The identify module (711) may identify a system seeking to access data. The identify module (711) may identify a system that may be hosting data. To identify a system may include determining the system name, address, security tokens, and policies.

The data retrieval module (712) obtains data from a system hosting data according to the security policies. It may control the period of time in which the second system may access the data, and in which the policy is transmitted to the second system. For example, the system hosting the data may be aware of a system maintenance or backup that occurs during the hours of 2:00 AM and 4:00 AM. The policy may specify that data may not be accessed during that timeframe. Similarly, a system may be aware of high usage or traffic during a specified time period, and may restrict access to data during that time to reduce system utilization during critical periods.

The communication module (713) may, based on the policy and identity related to a client, communicate the data retrieved. The identity may include security tokens, security protocols, system name, system address, time to communicate, and other policies related to communicating the data to the client. The communication module (713) may initiate a new connection with the client, or may use a prior request which has been maintained and not closed.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (701) of the computing device (700) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for managing data in a distributed computing environment, the method comprising:
    receiving, by a computing device comprising a processor, a request to communicate data between a first system hosting data and a second system accessing data;
    sending, by the computing device, a query to a policy interface to access rules that establish policies for sharing data between the first system and the second system, the policies comprising a first policy governing transformation of the data from the first system, and a second policy governing a communication protocol to be used; and
    transforming, according to the first policy, the data from the first system, and communicating the transformed data to the second system according to the communication protocol of the second policy.

2. The method of claim 1, wherein the request is received from the first system to initiate propagation of the data from the first system to the second system.

3. The method of claim 1, wherein the request is received from the second system to access data stored on the first system.

4. The method of claim 1, further comprising
    iterating a base table and an archive table containing information about the first system hosting data and the second system accessing data;
    populating a results table by performing table difference operations between the base table and the archive table; and
    extracting, out of the results table, identification of data to publish on a message bus.

5. The method of claim 4, further comprising archiving the results table for future reference.

6. The method of claim 1, wherein the policies further comprise a policy that controls a security protocol for transmitting data between the first system and the second system.

7. The method of claim 1, further comprising transmitting a further policy to the second system,
    wherein the further policy defines a duration that the transformed data received by the second system may be stored on the second system.

8. The method of claim 1, wherein the policies comprise a further policy specifying that systems matching a characteristic are allowed to access data hosted by the first system.

9. The method of claim 1, further comprising:
    compiling, based on a policy of the policies, a message indicating subscribers to receive the data to publish; and
    publishing, on a message bus, the compiled message.

10. A non-transitory storage medium comprising instructions that upon execution cause a system to:
    receive from a first system hosting data, a message that indicates:
        an identification of the first system; and
        a description of the hosted data, residing on the first system, being made available for publication on a data bus;
    receive a request to communicate data between the first system and a second system;
    send a query to a policy interface to access rules that establish policies for sharing data between the first system and the second system, the policies comprising a first policy governing transformation of the data from the first system, and a second policy governing a communication protocol to be used; and
    transform, according to the first policy, the data from the first system, and communicate the transformed data to the second system according to the communication protocol of the second policy.

11. The system of claim 10, wherein the policies further comprise an encryption policy to encrypt data communicated between the first system and the second system.

12. The non-transitory storage medium of claim 10, wherein the policies further comprise a policy that controls a security protocol for transmitting data between the first system and the second system.

13. The non-transitory storage medium of claim 10, wherein the instructions upon execution cause the system to:
    transmit a further policy to the second system,
    wherein the further policy defines a duration that the transformed data received by the second system may be stored on the second system.

14. A system comprising:
    a processor; and
    a non-transitory storage medium storing instructions executable on the processor to:
        identify a first system hosting data where the data meets a data interest of a second system;
        receive a request to communicate data between the first system and a second system;
        send a query to a policy interface to access rules that establish policies for sharing data between the first system and the second system, the policies comprising a first policy governing transformation of the data from the first system, and a second policy governing a communication protocol to be used; and
        transform, according to the first policy, the data from the first system, and communicate the transformed data to the second system according to the communication protocol of the second policy.

15. The system of claim 14, wherein the policies comprise a time policy that controls a period of time in which the second system may access the data, and wherein the instructions are executable on the processor to send the time policy to the second system.

16. The system product of claim 14, wherein the policies comprise a policy that contains security protocol regulations between the first system and the second system.

17. The system of claim 14, wherein the instructions are executable on the processor to:
    transmit a further policy to the second system,
    wherein the further policy defines a duration that the transformed data received by the second system may be stored on the second system.

* * * * *